United States Patent [19]

Fatutto

[11] 4,120,834
[45] Oct. 17, 1978

[54] MODIFIED POLYOLS
[75] Inventor: Pierluigi Fatutto, Mestre (Venice), Italy
[73] Assignee: Montedison S.p.A., Milan, Italy
[21] Appl. No.: 813,417
[22] Filed: Jul. 6, 1977
[30] Foreign Application Priority Data
Jul. 9, 1976 [IT] Italy .................. 25181 A/76
[51] Int. Cl.$^2$ ................ C08J 9/00
[52] U.S. Cl. ................ 521/164; 560/26; 521/167
[58] Field of Search ............ 260/2.5 AQ, 2.5 AM; 560/26

[56] References Cited
U.S. PATENT DOCUMENTS

| | | | |
|---|---|---|---|
| 2,948,691 | 8/1960 | Windemuth et al. | 560/26 X |
| 3,192,186 | 6/1965 | Muller et al. | 260/2.5 AM X |
| 3,905,925 | 9/1975 | Vervloet | 260/2.5 AM X |

Primary Examiner—Lewis T. Jacobs
Attorney, Agent, or Firm—Morgan, Finnegan, Pine, Foley & Lee

[57] ABSTRACT

The present invention relates to modified polyols, and more particularly to polyols modified with polyisocyanates that can be employed, among other things, as components for formulations for polyurethanes or polyurethanes-isocyanurates.

More particularly, the modified polyols of this invention consist of the reaction product of diols having an equivalent weight ranging from 30 to 150, with polyisocyanates having an equivalent weight ranging from 50 to 200, characterized in that said modified polyols exhibit a diol/isocyanate weight ratio comprised between 10 and 1, preferably between 5 and 1.6, and a OH/NCO equivalent ratio comprised between 3 and 50, preferably between 4 and 10.

8 Claims, No Drawings

MODIFIED POLYOLS

BACKGROUND OF THE INVENTION

The polyols employed as components for formulations for polyurethanes generally consist in products obtained from the polycondensation of ethylene oxide, propylene oxide and respective glycols, in the presence of polyhydroxyl compounds, such as for example as glycerin, trimethylolpropane, pentaerythritol, sorbitol, or of polyfunctional alkanolamines, such as for example as ethylene diamines, triethanolamine and the like.

These polyols have rather high molecular weights, generally comprised between 300 and 6000.

Such compounds, due to reaction with polyisocyanates in the presence of suitable catalysts, lead either to polyurethanes or to polyurethanes-isocyanurates, depending on the equivalent ratio (NCO/OH) and on the weight ratio.

A drawback common to these polyols consists in that their polymeric chains exhibit a certain number of C—O—C bonds (ethereal bonds), that are very sensitive to the action of heat and of flame which results in a significant decrease in the flame and heat resistance characteristics of the polyurethanes obtained by use of such polyols.

On the other hand, if diols or polyols are used containing no or few ethereal bonds, it is necessary to employ compounds having a relatively low molecular weight, generally lower than 300, in order to reduce the amount of diols or of polyols in respect to the polyisocyanates. In this case, however, serious difficulties are met because these products are too reactive and have too low a viscosity to be capable of providing polyurethane foams having acceptable mechanical properties (especially friability).

OBJECTS OF THE INVENTION

Thus, it is an object of the present invention to provide polyols free from the drawbacks mentioned hereinbefore.

Another object is to provide formulations capable of leading to polyurethane foams free from the drawbacks mentioned hereinbefore.

Other objects of the invention will be apparent from the disclosure which follows:

GENERAL DESCRIPTION OF THE INVENTION

It has been found that the objects of this invention may be realized by providing modified polyols that consist of the reaction product of diols having an equivalent weight ranging from 30 to 150, and polyisocyanates having an equivalent weight comprised between 50 and 200, said reaction products being furthermore characterized by a diol/isocyanate weight ratio comprised between 10 and 1, preferably between 5 and 1.6, and by OH/NCO equivalent ratios ranging from 3 to 50, preferably from 4 to 10.

The diols to be utilized according to this invention are of the type having a linear or ramified paraffinic chain, or of the ethereal type, with two free hydroxyls, either both primary, or both secondary, or one primary and the other secondary.

Typical examples of such compounds are monopropylene glycol (OH—CH(CH$_3$)—CH$_2$OH) and diethylene glycol (OH—CH$_2$—CH$_2$—O—CH$_2$—CH$_2$—OH).

The polyisocyanates to be employed according to the present invention are selected from a wide range of bi- or polyfunctional products, preferably of the aromatic type.

Typical examples of such polyisocyanates are 2,4- and/or 2,6-toluene diisocyanate (TDI), 4,4-diphenylmethane diisocyanate (MDI) and polyphenylpolymethylene-polyisocyanates (CRUDE MDI).

The modified polyols-polyethers according to this invention are generally middle or high viscosity liquids, containing a certain number of free OH groups and of free —NH— groups. The number of free OH groups depends on the diol/polyisocyanate ratio and on the reaction conditions.

The modified polyols-polyethers according to this invention exhibit, furthermore, a density comprised between 1.0 and 1.3 g/cm$^3$ at 20° C.

These products are particularly suited to be used as polyol components of formulations for polyurethanes or polyurethanes-isocyanurates. To this purpose they are used in substitution of or in admixture with the conventional polyols usually employed.

The use of the polyols according to the present invention permits one to eliminate or considerably reduce the utilization of flame-proof additives while still obtaining self-extinguishing products or at least products characterized by a low combustion rate.

SPECIFIC DESCRIPTION OF THE INVENTION

The following examples are given to better illustrate the essential features of the present industrial invention, without being, however, a limitation thereof.

EXAMPLE 1

1000 g of monopropylene glycol (equivalent weight = 38) were introduced, at room temperature, into a 3-liter glass flask. 100 g of CRUDE MDI (polymethylenediphenyl-diisocyanate having an equivalent weight of 140) were added thereto under stirring. A cream-coloured emulsion formed at the reaction beginning; then, after a 10-minute stirring, during which the temperature rose up to 60° C., the liquid became limpid and amber-coloured. Successively further 400 grams of CRUDE MDI were gradually added under stirring, stirring having been carried on until the liquid became limpid again.

The weight ratio between monopropylene glycol and isocyanate was 2:1, while the equivalent ratio was 7.4:1.

a The polyol so obtained a density of 1.13 g/cm$^3$, a Brookfield viscosity of 10,000 cps at 20° C., an equivalent weight of 66 in respect of groups OH only, and of 57 in respect of the sum OH + NH.

EXAMPLE 2

1000 g of diethylene glycol (equivalent weight = 53) were introduced at room temperature into a 3-liter glass flask. Under stirring, 100 g of CRUDE MDI (equivalent weight = 140) were added thereto.

A cream-coloured emulsion formed at the beginning of the reaction; then, after a 10-minute stirring, during which the temperature rose up to 60° C., the liquid became limpid and amber-coloured.

Further 400 g of MDI (CRUDE) were gradually added under stirring and stirring was carried on until the liquid became limpid again.

The weight ratio between diethylene glycol and isocyanate was 2:1, while the equivalent ratio was 5.3:1.

The resulting polyol had a density of 1.18 g/cm$^3$, a Brookfield viscosity of 9000 cps at 20° C., an equivalent weight of 98 in respect to OH and of 79.5 in respect to the sum OH + NH.

EXAMPLE 3

It was operated as in Example 2, but employing a glycol/isocyanate weight ratio = 100/35, and an equivalent ratio = 7.5:1.

The polyol so obtained had an equivalent weight of 91.7 in respect to the OH groups and of 79.5 in respect to the sum OH + NH. The Brookfield viscosity was 1368 cps at 25° C. and the density 1.18 g/cm$^3$ at 22° C.

EXAMPLE 4

A polyurethane foam was prepared by using a laboratory apparatus equipped with an electrical stirrer of the marine screw propeller type, and with a 70×60×60 cm mold, the cream time being of 25 seconds.

The starting formulation had the following qualitative-quantitative composition:

Polyol of the type described in the preceding Example 1: 100 parts by weight
Glycerin: 3.34 parts by weight
Dimethylcyclohexylamine: 2.00 parts by weight
Silicon DC 193 (1): 1.30 parts by weight
Trichlorofluoromethane: 25.00 parts by weight
CRUDE MDI(2): 220 parts by weight (1) A silicone surfactant produced by Dow Corning, placed on the market as SILICONE DC 193;
(2) Polyphenyl-polymethylene-polyisocyanate produced by Montedison and placed on the market as TEDIMON 31.

The resulting polyurethane foam exhibited the following characteristics:

Density (ASTM D 1622-63): 48 kg/m$^3$
Compression strength (ASTM C 1621/63): 3.3 kg/cm$^2$
Flexural strength (ASTM D 790/66): 7.2 kg/cm$^2$
Friability (ASTM C 421/67): 10′: 1% weight loss Dimensional stability (ASTM D 2126/66):

24 hours at 100° C.: −0.3% volume
24 hours at 150° C.: +21% volume
Self-extinguishing power (ASTM 1692): S.E. (self-extinguishing)
Butler Chinney Test (ASTM D 3014/74): 25% weight loss

EXAMPLE 5

Operating according to Example 4, use was made of a starting formulation having the following qualitative-quantitative composition:

Polyol of the type described in the preceding Example 3: 18.7 parts by weight
Diethylene glycol containing 15% of CH$_3$COOK: 5.3 parts by weight
Triethylamine: 0.5 parts by weight
Tris (β-chloroethyl) phosphate: 15 parts by weight
Trichlorofluoromethane: 20 parts by weight
CRUDE MDI: 100 parts by weight A polyurethane foam was so obtained, that exhibited the following characteristics:

Density: 36 kg/m$^3$
Friability 10′: 1% weight loss
Self-extinguishing power: It does not burn
Bitler Chinney Test: 27% weight loss

EXAMPLE 6

Operating according to Example 4, a starting formulation having the following qualitative-quantitative composition was employed:

Polyol of the type described in the preceding Example 1: 28.7 parts by weight
Diethylene glycol containing 15% of CH$_3$COOK: 5.3 parts by weight
Triethylamine: 0.3 part by weight
Tin dibutyl dilaurate: 0.1 part by weight
Tris (β-chloroethyl) phosphate: 15 parts by weight
Trifluorochloromethane: 20 parts by weight
CRUDE MDI: 100 parts by weight A polyurethane foam was so obtained, that exhibited the following characteristics:

Density: 36 kg/m$^3$
Friability 10′: 2% weight loss
Self-extinguishing power: It does not burn
Butler Chinney Test: 22% weight loss

What we claim is:

1. Modified polyols consisting of the reaction product of diols having an equivalent weight ranging from 30 to 150, with polyisocyanates having an equivalent weight ranging from 50 to 200, characterized in that said modified polyols exhibit a diol/isocyanate weight ratio comprised between 10 and 1 and an OH/NCO equivalent ratio comprised between 3 and 50.

2. Modified polyols according to claim 1, characterized in that said modified polyols exhibit a diol/isocyanate weight ratio between 5 and 1.6 and an OH/NCO equivalent ratio comprised between 4 and 10.

3. Modified polyols according to claim 1, wherein said polyols are selected from the group consisting of polyols having a linear paraffin chain, polyols having a ramified paraffin chain and polyols of the ethereal type with two free primary and/or secondary hydroxyls.

4. Modified polyols consisting of the reaction product of mono-propylene glycol having an equivalent weight ranging from 30 to 150, with polyisocyanates having an equivalent weight ranging from 50 to 200, characterized in that said modified polyols exhibit a diol/isocyanate weight ratio comprised between 10 and 1 and an OH/NCO equivalent ratio comprised between 3 and 50.

5. Modified polyols consisting of the reaction product of diethylene glycol having an equivalent weight ranging from 30 to 150, with polyisocyanates having an equivalent weight ranging from 50 to 200, characterized in that said modified polyols exhibit a diol/isocyanate weight ratio comprised between 10 and 1 and an OH/NCO equivalent ratio comprised between 3 and 50.

6. Polyols according to claim 1, characterized in that said polyisocyanates are bi- or polyfunctional products of the aromatic type.

7. Polyols according to claim 6, characterized in that said polyisocyanates are selected from the group consisting of 2,4- and/or 2,6-toluene diisocyanate, 4,4-diphenyl-methane diisocyanate (MDI) and polyphenyl-polymethylene polyisocyanates.

8. Formulations for polyurethane foams containing, as polyol-polyether components, one or more of the modified polyols according to claim 1.

* * * * *